US009154068B2

(12) United States Patent (10) Patent No.: US 9,154,068 B2
Andrejak et al. (45) Date of Patent: Oct. 6, 2015

(54) METHOD FOR REGULATING A GENERATOR SET

(75) Inventors: Jean-Marie Andrejak, Saint Yrieix (FR); Samuel Moser, Gond-pontouvre (FR); Patrice Betge, L'isle D'espagnac (FR)

(73) Assignee: MOTEURS LEROY-SOMER, Angouleme (FR)

( * ) Notice: Subject to any disclaimer, the term of this patent is extended or adjusted under 35 U.S.C. 154(b) by 33 days.

(21) Appl. No.: 14/342,445

(22) PCT Filed: Aug. 28, 2012

(86) PCT No.: PCT/IB2012/054401
§ 371 (c)(1),
(2), (4) Date: Apr. 1, 2014

(87) PCT Pub. No.: WO2013/030759
PCT Pub. Date: Mar. 7, 2013

(65) Prior Publication Data
US 2014/0225575 A1    Aug. 14, 2014

(30) Foreign Application Priority Data
Sep. 1, 2011 (FR) ...................................... 11 57722

(51) Int. Cl.
*H02P 9/00* (2006.01)
*H02P 9/10* (2006.01)
*H02P 9/04* (2006.01)
*H02P 9/30* (2006.01)

(52) U.S. Cl.
CPC .. *H02P 9/10* (2013.01); *H02P 9/04* (2013.01); *H02P 9/107* (2013.01); *H02P 9/302* (2013.01)

(58) Field of Classification Search
CPC ......................................................... H02P 9/00
USPC ............................................................. 322/17
See application file for complete search history.

(56) References Cited

U.S. PATENT DOCUMENTS

| 4,156,172 | A | 5/1979 | Hucker et al. |
| 5,703,410 | A | 12/1997 | Maekawa |
| 6,900,618 | B2 * | 5/2005 | Maehara ......................... 322/28 |
| 6,940,259 | B2 * | 9/2005 | Suzuki et al. ................... 322/20 |

(Continued)

FOREIGN PATENT DOCUMENTS

| FR | 1 322 775 | 3/1963 |
| FR | 2 321 796 A1 | 3/1977 |
| WO | WO 2007/045801 A1 | 4/2007 |

OTHER PUBLICATIONS

International Search Report issued in International Patent Application No. PCT/IB2012/054401 mailed Nov. 20, 2013.

(Continued)

*Primary Examiner* — Joseph Waks
(74) *Attorney, Agent, or Firm* — Oliff PLC

(57) ABSTRACT

A method for regulating the output voltage of the alternator of a generator set, the generator set including a heat engine driving the alternator and the alternator including a rotor having a pole wheel. The method includes the following step: modifying the current in the pole wheel, at least during an increase in the load at the outlet of the alternator, in such a way as to bring the output voltage of the alternator to a value lower than the value before the increase in the load, the modification of the current in the pole wheel depending on the deceleration of the heat engine.

11 Claims, 5 Drawing Sheets

(56) References Cited

U.S. PATENT DOCUMENTS

Figure 1:
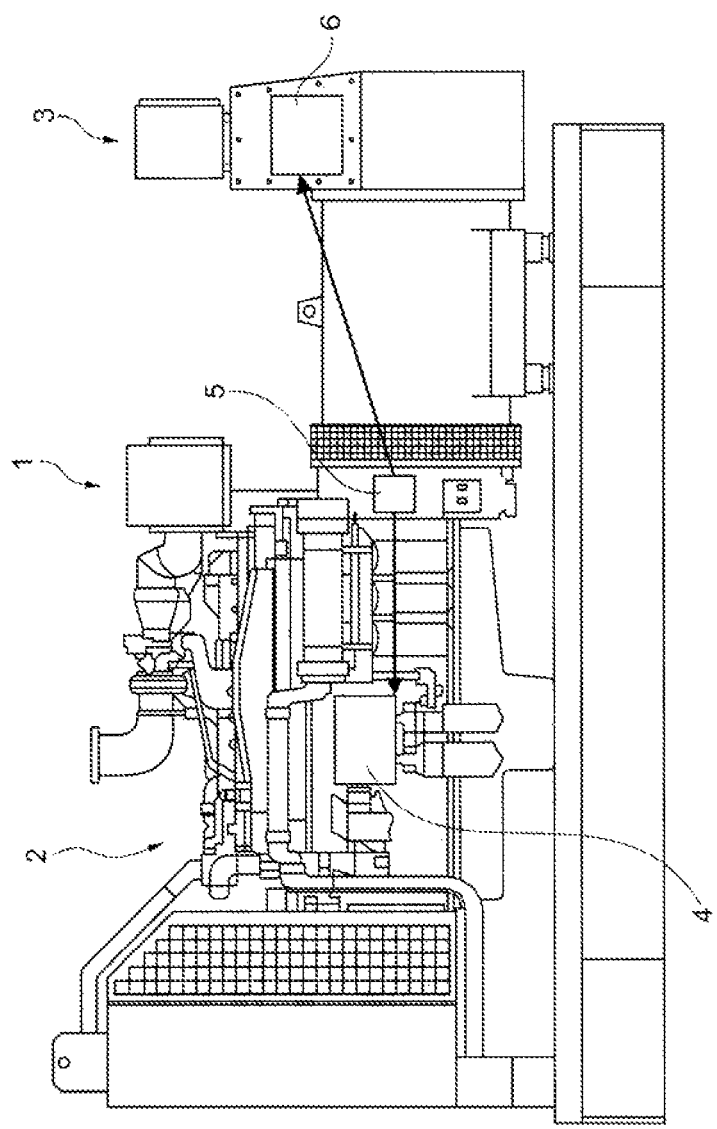

| | | |
|---|---|---|
| 7,081,738 B2 * | 7/2006 | Muramatsu et al. .............. 322/24 |
| 7,635,922 B2 * | 12/2009 | Becker ......................... 290/40 C |
| 7,944,185 B2 * | 5/2011 | Jabaji et al. ...................... 322/45 |
| 7,944,186 B2 * | 5/2011 | Jabaji et al. ...................... 322/45 |
| 8,049,348 B2 | 11/2011 | Czajkowski |
| 2005/0231174 A1 * | 10/2005 | Iwatani ............................ 322/25 |
| 2006/0022647 A1 * | 2/2006 | Asada .............................. 322/28 |
| 2006/0186863 A1 * | 8/2006 | Yamamoto et al. ............. 322/28 |
| 2007/0228735 A1 | 10/2007 | Becker |
| 2009/0102437 A1 * | 4/2009 | Nakagawa ..................... 323/217 |

OTHER PUBLICATIONS

Written Opinion of the International Searching Authority issued in International Patent Application No. PCT/IB2012/054401 mailed Nov. 20, 2013 (with translation).

* cited by examiner

METHOD FOR REGULATING A GENERATOR SET

The present invention relates to the regulating of the alternators of generator sets.

A generator set consists of the assembly of an engine and an alternator. In order to provide a nominal voltage and frequency, both the engine and the alternator are equipped with regulating means. The engine is equipped with an electronic speed regulator, integrated into the fuel injection system of the engine. The regulation of the speed of the engine relies among other things on the measurement of the engine shaft rotation speed, for example by a sensor counting per time unit the number of teeth of a toothed ring gear passing in front of the sensor.

By virtue of the signal delivered by this sensor, the speed regulator injection computer determines the fuel injection level so as to maintain the speed at a predefined value, but does not have direct knowledge of the load level which is applied to the engine, since no economic means exists for informing the computer of this load level.

Each variation in load applied to the engine, whether it be an increase or a decrease, results in a transient decrease or increase in the engine revs that the speed regulator attempts to correct through an appropriate injection level.

In known generator sets, it is only by virtue of the knowledge of the speed and injection level that the regulator determines the load level which is applied to the engine.

The torque C demanded of the engine is directly proportional to the current I at the output of the alternator. Indeed, the power law P for the engine is:

$$P = C \cdot w,$$

where w is the engine rotation speed.
The power law P for the alternator is:

$$P = U \cdot I \cdot \cos(\phi),$$

where U is the output voltage of the alternator and $\phi$ the phase shift between the current I and the voltage U.

The engine and the alternator being linked mechanically, it is possible to write, to within the efficiency of the coupling, that:

$$C \cdot w = U \cdot I \cdot \cos(\phi).$$

During the application of a large active load, $\cos(\phi)$ becomes close to 1, and the voltage of the alternator drops. The alternator is equipped with a voltage regulator which rapidly corrects this voltage drop by increasing the current in the pole wheel.

The variation in the load also results in a drop in speed, since the torque C demanded of the engine increases. The engine being incapable of responding instantaneously to this demand, its speed w drops, since a part of the torque C is drawn from the rotational kinetic energy reserve.

In a known manner, so as to avoid exceeding the maximum torque that can be demanded of the engine, the voltage regulator, as a function of frequency, causes the voltage to drop so as to keep the torque demand constant at the level of the engine. When the speed ω reduces, the voltage regulator causes the output voltage U to decrease in a proportional manner so that the torque C remains constant.

This strategy is effective for so-called former-generation engines, such as atmospheric or high-inertia engines, and for low to moderate increases in load.

Now, turbocharger engines are increasingly being used within generator sets. A drawback of this type of engine is the degradation of its performance if turbocharging cannot be initiated correctly.

Now, an abrupt increase in the load is liable to slow the engine too much for correct operation of the latter. During idle operation, the air intake pressure is close to atmospheric pressure but as soon as the increase in the load is applied to the generator set, the speed of the engine drops to such a point that, despite the reaction of the speed regulator on the injection system, the exhaust gas stream is not sufficient to initiate the turbine or turbines of the turbochargers to their operating regime. They are then incapable of causing the intake pressure to increase, required in order for the engine to be capable of accelerating and of regaining its nominal speed. There therefore exists a point of no return that it is required to avoid reaching.

A known solution, called LOAD ACCEPTANCE MODULE, consists in causing the voltage to drop no longer in proportion to the speed but abruptly, practically as soon as the drop in speed begins, at the level of what is called the "elbow". The voltage U being decreased suddenly, the torque C demanded of the engine is also decreased, facilitating speed pick-up and its return to the operating point.

Figure 2:
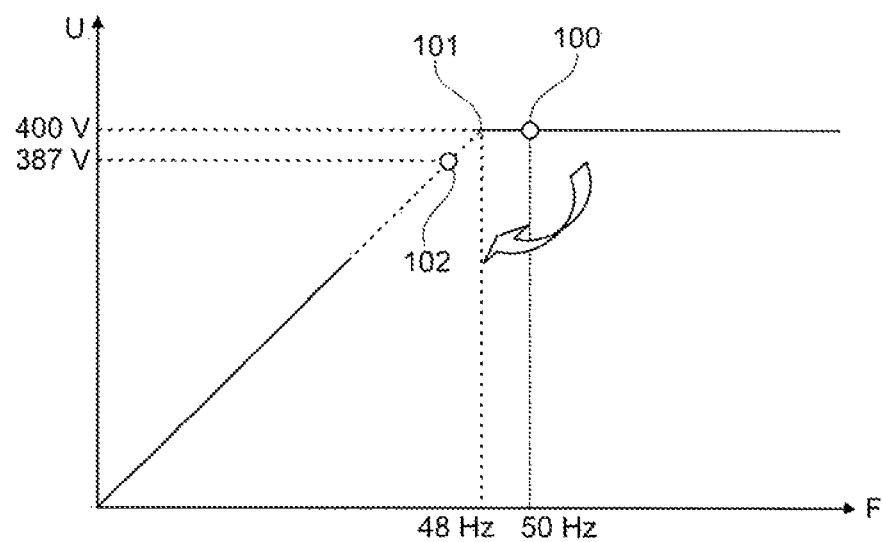

The nominal operating point 100 of a generator set according to the prior art is represented on the curve of FIG. 2, corresponding for example, as illustrated, to a voltage U at the output of the alternator equal to 400 V and a frequency F equal to 50 Hz.

When an increase in the load takes place, the speed w of the engine drops, the frequency F reaching a threshold value of 48 Hz at a point 101 called the "elbow". In the known solution, the voltage regulator of the alternator causes the voltage U to drop in a manner proportional to the speed w, so as to keep the torque C demanded of the engine constant, so as to reach a new operating point 102.

Figure 3:
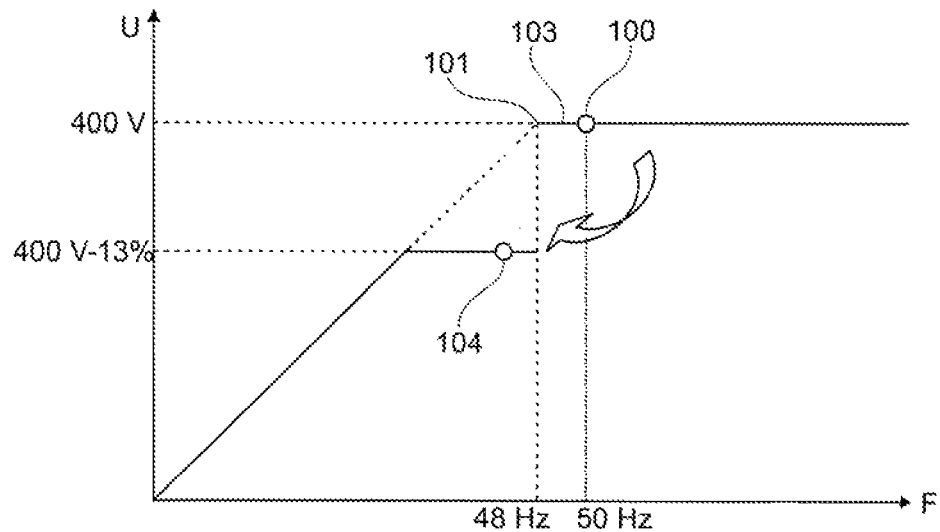

To alleviate the previously stated drawbacks of this procedure, a variant of a regulating procedure according, to the prior art is illustrated in FIG. 3.

The derivative of the speed of the engine is constantly measured, for example at the point 103. When an increase in the load takes place and the speed goes below the threshold value 101, the voltage regulator of the alternator causes the voltage U to drop no longer in a manner proportional to the speed w, but in an abrupt and fixed manner, as soon as the drop in speed begins, below the point 101, in the example illustrated, the voltage is thus reduced by 13% at the operating point 104.

The value of the voltage drop is fixed whatever the level of increase in the load, and this may pose a problem during small increases especially, the voltage drop not always being suited to the increase in the load applied to the generator set.

It is known from U.S. Pat. No. 5,703,410 to monitor the excitation current of an alternator and the injection of fuel on the basis of the knowledge of the rectified voltage at the output of the alternator.

It is also known from application EP 1 938 447 to control the fuel intake actuator of a generator set by virtue of a monitoring device delivering a control signal which is substituted for an output signal of the speed regulator when a load variation is detected.

The application US 2007/0228735 A1 discloses an energy production system in which a control device acts on a generator to change its output voltage in response to a variation in the rotation speed. In an example, the control device acts directly on a controlled rectification bridge (SCR) and its control prevails over the control performed by the voltage regulator. In this situation, the voltage regulator can no longer play its role and starts under complete saturation. Upon returning to normal operation, a jerk will occur if the voltage regulator is not reset.

There exists a requirement to further improve the performance of generator sets, especially during increases in the load, so as among other things to facilitate the use of turbocharger engines.

The invention is aimed at addressing this requirement at least in part and achieves same, according to one of its aspects, by virtue of a method for regulating the output voltage of the alternator of a generator set, the latter comprising an engine driving the said alternator, the alternator comprising a rotor having a pole wheel, the method comprising the following step:

modifying, at least upon an increase in the load at the output of the alternator, the current in the pole wheel, so as to bring the output voltage of the alternator to a value below that before increase in the load, the modification of the current in the pole wheel being dependent on the deceleration of the engine.

More particularly, in an exemplary preferred implementation of the invention, the method comprises the modification of the setpoint voltage.

Thus, the method implements a voltage regulator which permanently monitors the output voltage of the alternator and tailors the current in the pole wheel so as to maintain the output voltage of the alternator at the setpoint voltage. If a new charge variation occurs, the voltage regulator makes it possible to keep the output voltage of the alternator in correspondence with the setpoint voltage which is fixed for it.

This makes it possible, during, load variations, to have as more efficacious response than in the known solutions. Indeed, the response is weighted and adapted to the measured speed variation. The variation of the speed of the generator set is reduced and returns to normal operating conditions more rapidly than in the known solutions.

The control of the output voltage of the alternator during an increase in the load is performed simply by transmitting as change of setpoint voltage to the regulator; the latter retains its role of regulator and controls the current in the pole wheel in such a way that the output voltage is equal to the new setpoint voltage.

By virtue of the invention, the current in the pole wheel is decreased appropriately even in the case of low applied load and the engine torque is reduced in an appropriate manner for the duration required for the increase in the power of the engine.

The voltage regulation being related to the time constant of the exciter and the speed regulation being, related to the, much more significant, mechanical time constant of the engine, the invention makes it possible to address this problem area of the time constants, by virtue of the fact that the two regulators are placed in series rather than in parallel.

The invention allows the application to the alternator of a correction in the form of a voltage drop, no longer fixed as in the prior art, but for example proportional to the deceleration of the engine.

The bigger the increase in the load, the faster the drop in speed, since, at the moment of the application of the load, only the rotational kinetic energy reserve can respond to the torque demand. The voltage drop is then, by virtue of the invention, big enough to relieve the engine of the requested torque and thus aid it to regain its nominal rotation speed.

Once the nominal rotation speed has been reached or is close enough, in particular greater than a predefined threshold, the voltage of the alternator is progressively raised to a setpoint point, the effect of which is to progressively increase the torque demanded of the engine, as a function of the latter's capabilities.

The rotation speed of the engine may be known on the basis of the frequency of the output voltage of the alternator. Thus, the deceleration of the engine may be computed on the basis of the knowledge of the frequency at each instant.

The rotation speed of the engine can as a variant be measured by a speed sensor of the engine or of the alternator, for example a sensor delivering pulses at a frequency proportional to the engine shaft rotation speed.

The deceleration is determined by the derivative with respect to time of a quantity representative of the rotation speed of the engine and this derivative may be computed continually, at regular intervals, or at least when the rotation speed of the engine approaches the elbow.

The evolution of the value of the current in the pole wheel as a function of the deceleration of the engine can follow a predefined control law, for example prerecorded in as table, or computed. The computation can involve at least one parameter such as the power level at the moment at which the correction is applied.

The modification of the current in the pole wheel can be performed so as to reach a setpoint voltage of the alternator, the discrepancy between the setpoint voltage and the nominal voltage being dependent on the deceleration, for example in a linear or non-linear manner.

When the rotation speed of the engine increases, the value of the current in the pole wheel may be modified again so as to bring the output voltage back to its value before increase in the load.

Stated otherwise, as soon as the rotation speed of the engine increases again, the value of the current in the pole wheel may be increased in an appropriate manner so that the voltage also increases.

The correction may be applied on the basis of a predefined threshold of increase in the load, that may be constant or computed as a function of at least one parameter, for example the power level. In an example, the correction is applied on the basis of a slowing, of the engine below a predefined speed, possibly being for example the nominal speed less 4%, especially a frequency of the voltage of 48 Hz for a nominal speed corresponding to a nominal frequency of 50 Hz.

The output of the alternator may be linked to a three-phase network, the nominal rotation speed of the engine being for example 1500 rpm and the nominal output voltage between phases of the alternator being for example 400 V and 50 Hz. The application of a decrease in the voltage proportional to the deceleration of the engine can for example be done when the frequency goes below or becomes equal to 48 Hz.

To act on the current in the pole wheel, it is possible to act on the exciter excitation current when the alternator comprises an exciter having a coiled stator. The modification of the current in the pole wheel can be performed for example by decreasing the exciter excitation current.

In particular, in the case of an alternator comprising an exciter whose stator comprises permanent magnets, it is possible to act on the current in the pole wheel by arranging on the rotor a switching system making it possible to modulate the current in the pole wheel.

In such a variant, the alternator can comprise, at the rotor, a controller controlling the switching system. A transmission system, for example wireless, can communicate with the voltage regulator situated at the stator of the alternator.

The controller can control the switching system so as to regulate the output voltage of the alternator, for example by a pulse width modulation of the voltage across the terminals of the pole wheel. The controller can vary the duty ratio of the pulse width modulation as a function of the voltage sought at the output of the alternator. Such a variant makes it possible to improve the response time of the alternator when the load varies.

The regulating method according to the invention can be combined with other regulating measures aimed at improving the operation of the generator set, for example measures aimed at modifying the flow rate of fuel injected into the engine as a function of the active power at the output of the alternator.

The subject of the invention is further, according to another of its aspects, a system for regulating the output voltage of the alternator of a generator set, the latter comprising an engine driving the said alternator, the alternator comprising a rotor having a pole wheel, the regulating system being configured to modify, at least when the load increases at the output of the alternator, the value of the current in the pole wheel, so as to bring the output voltage of the alternator to a value below that before increase in the load, the modification of the value of the current in the pole wheel being dependent on the derivative of the rotation speed of the engine, especially proportional to the deceleration of the engine.

The regulating system may be configured to reduce the voltage of the alternator to a setpoint value chosen in such a way that the discrepancy between the nominal voltage and the setpoint voltage is, for example, proportional to the deceleration.

The decreasing of the output voltage by application of a reduction in the voltage proportional to the deceleration can be done for example as soon as the frequency of the voltage drops below a predefined value, for example 48 Hz, which conveys the application of a load beyond a predefined threshold.

The regulating system may be integrated into the voltage regulator of the alternator. The operation of the engine speed regulator can be totally autonomous from the regulating system according to the invention.

All the characteristics of the invention which have been listed hereinabove in respect of the method hold also in respect of the regulating system.

Figure 4:
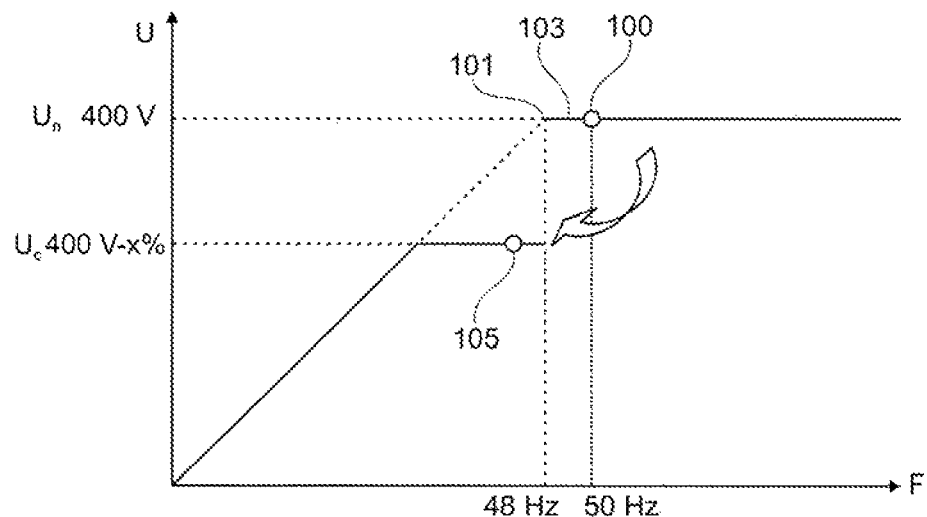
Figure 5:
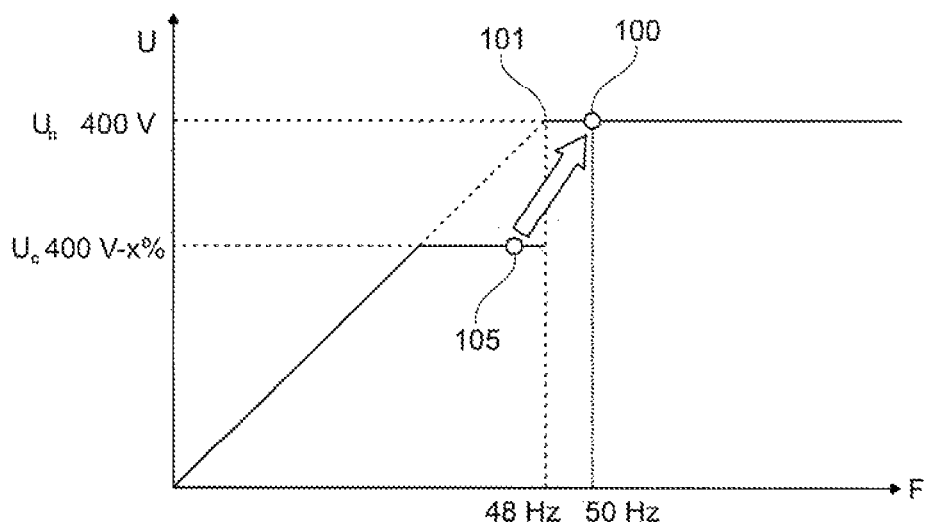
Figure 6:
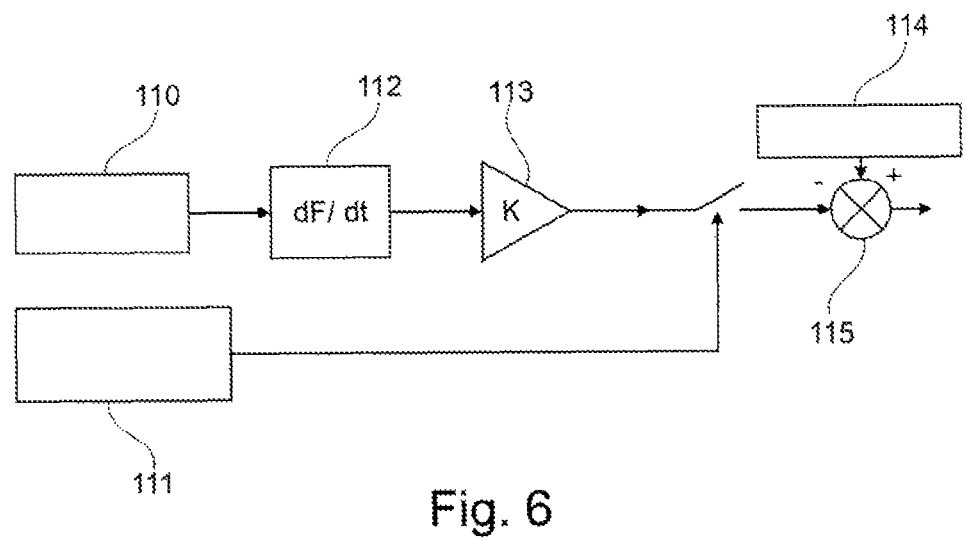
Figure 7:
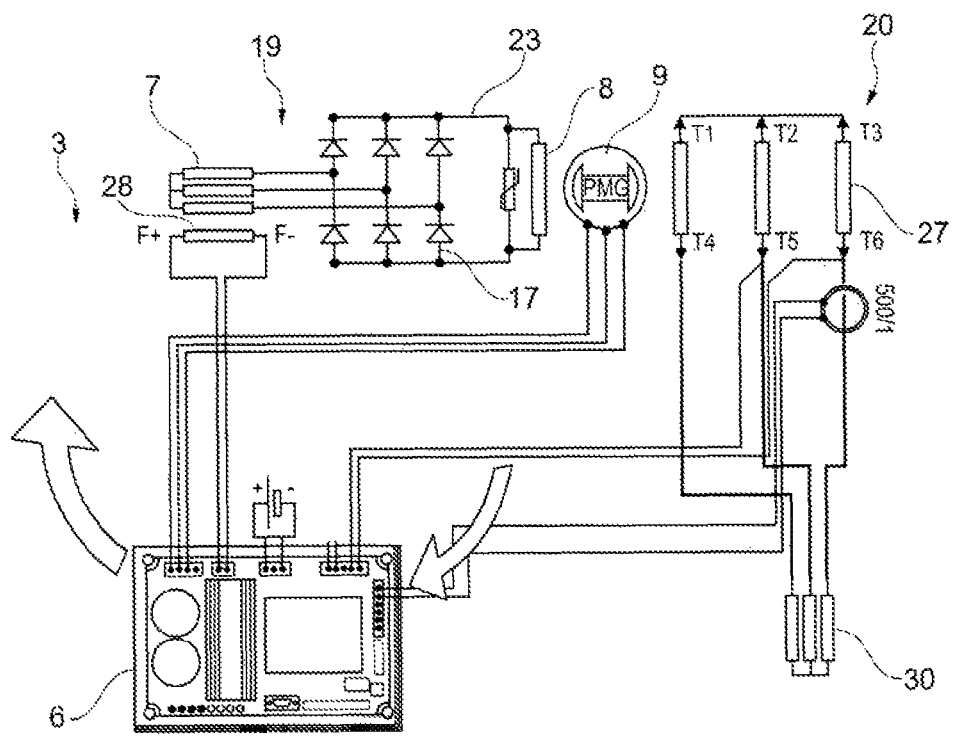
Figure 8:
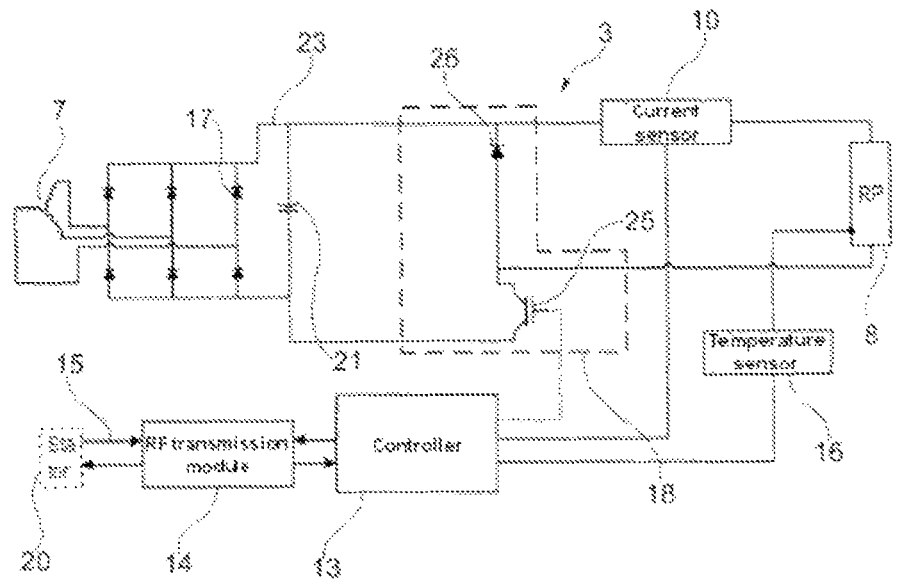
Figure 9:
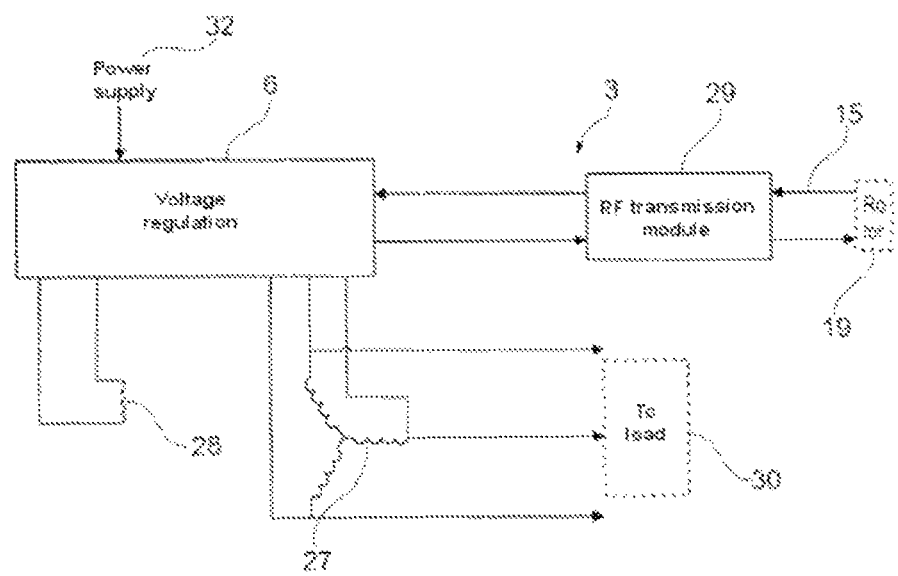

The invention may be better understood on reading the detailed description which follows of nonlimiting examples of implementation of the latter, and on examining the appended drawing in which:

FIG. 1 represents a generator set according to the invention,

FIGS. 2 and 3 already described represent voltage-frequency curves illustrating the operation of a generator set according to the prior art, FIGS. 4 and 5 represent voltage-frequency curves illustrating the operation of a generator set according to the invention, FIG. 6 represents in a schematic manner the regulating chain of a generator set according to the invention, FIG. 7 represents an alternator according to the invention, taken in isolation, and FIGS. 8 and 9 represent an alternator variant according to the invention.

The generator set 1 according to the invention, illustrated in FIG. 1, comprises an engine 2 and an alternator 3.

The engine 2 is advantageously a turbocharged engine, but the invention is not limited to a particular engine type.

The output of the alternator 3 is linked for example to a three-phase network, the nominal speed $w_n$ of rotation of the engine 2 being for example 1500 rpm, the nominal frequency $F_n$ being equal for example to 50 Hz, and the nominal output voltage $U_n$ between phases of the alternator being for example 400 V.

The engine 2 comprises a speed regulator 4 comprising an injection computer which computes the injection (or the control of the gases) of the engine so that the rotation speed w is maintained constant as far as possible at the nominal value $w_n$.

The engine 2 comprises a speed sensor 5, that may be, for example, inductive, capacitive or optical. The sensor 5 is for example arranged in front of a toothed ring gear driven in rotation by the engine 2 and delivers to the injection computer pulses at a frequency proportional to the rotation speed w.

The speed regulator 4 computes the appropriate fuel injection level for maintaining the speed w of the engine 2 equal to its nominal value $w_n$.

The alternator 3 comprises, as illustrated in FIG. 7, a voltage regulator 6 which monitors the voltage U at the output of the alternator and determines the current to be applied in the pole wheel 8 to maintain the nominal voltage amplitude.

The regulator 6 may be supplied by a generator having permanent magnets 9, but the invention is not limited to a particular way of supplying the regulator.

The rotor 19 of the alternator 3 comprises in the example described a rectifier 17 composed of a full-wave diode bridge, supplying a DC bus 23 on the basis of the exciter armature 7.

The alternator 3 comprises at the stator 20 an exciter inductor 28 and the armature 27 of the main machine, linked to the load 30.

The generator set 1 according to the invention comprises a system for regulating the output voltage of the alternator 3, designed to detect an increase in the load, on the basis of the knowledge of the frequency at the output of the alternator 3.

The regulating system is configured to modify, when an increase in the load beyond a predefined threshold is detected, the value of the current in the pole wheel, so as to bring the output voltage U of the alternator 3 to as value below that before increase in the load.

The modification of the value of the current in the pole wheel is dependent on the derivative of as quantity representative of the rotation speed w of the engine 2.

The quantity representative of the rotation speed w of the engine 2 is in the example considered the frequency F of the output voltage U of the alternator 3.

In a generator set according to the invention, the voltage drop is not fixed but depends, for example in a proportional manner, on the derivative of the speed, as illustrated in FIG. 4, where, when an increase in the load leads to a decrease in the frequency F of rotation to a value below or equal to a predefined value, 48 Hz in the example considered, the voltage U is abruptly reduced by x % to reach an operating point 105.

In order to reduce the voltage U to a new setpoint value $U_c$, the value of the current in the pole wheel is modified. The setpoint value is determined in such a way that the discrepancy between the nominal voltage $U_n$ and the setpoint voltage $U_c$ is, for example, proportional to the derivative of the frequency dF/dt. The evolution of the voltage as a function of the derivative of the frequency dF/dt follows a predefined control law, which may be tabulated and may depend optionally on at least one parameter, for example the power level.

The modification of the current in the pole wheel facilitates the increase in the rotation speed w of the engine 2 on account of the decrease in the torque C.

Once the rotation speed w increases, the value of the current I in the pole wheel can again be modified, so as to bring the value of the output voltage U back to that before increase in the load, to the nominal operating point 100, as illustrated in FIG. 5.

As illustrated in FIG. 6, the frequency F is measured at each instant in step 110, its derivative dF/dt being computed in step 112.

In the absence of any applied correction, the regulating chain maintains in step 115 the voltage of the alternator at a setpoint value 114.

The correction to be applied is determined in step 113.

In step 111, the system determines whether or not the correction must be applied. The correction is for example applied if the frequency of rotation has decreased by more than a predefined amount, for example has gone below or become equal to 48 Hz for a nominal rotation speed of 50 Hz, this corresponding to a variation of more than 4%.

The voltage regulator can act in a conventional manner on the excitation current at the stator 20 to modify the current in the pole wheel and thus vary the voltage U.

In the variant represented in FIGS. 8 and 9, the rotor comprises a built-in communication system, and the DC bus 23 is linked to a switching system 18. A filtering capacitor 21 may be envisaged.

The switching system 18 may be composed, for example, as illustrated, of a free wheel diode 26 and of a switchable electronic component 25, for example an IGBT transistor.

A controller 13 controls the switching system 18 so as to regulate by pulse width modulation, in the example of the IGBT setup, the current in the pole wheel 8. The duty ratio β of the pulse width modulation is dependent on the output voltage of the main machine, so as to maintain as far as possible the voltage delivered by the alternator 3 at the desired value.

The rotor comprises in the example illustrated a current sensor 10 for measuring the current in the pole wheel 8. The value thus measured of the current is transmitted to the controller 13.

The stator 20 is powered by a power supply 32, and the exciter inductor 28 is coiled, in the example described. An HF wireless communication system is arranged between the controller 13 of the rotor and the voltage regulator 6 of the stator 20 of the alternator 3. The wireless communication system is composed of a transmission module 14 arranged at the rotor, of a transmission module 29 arranged at the stator 20, and of wireless transmission pathways 15 linking the said modules.

The value of the current in the pole wheel 8, measured by the current sensor 10 of the rotor 19, is transmitted to the voltage regulator 6 of the stator 20 by the wireless communication system 14, 15, 29.

The invention is not limited to the examples which have just been described. For example, the exciter is based on permanent magnets, in a variant of FIG. 9.

The expression "comprising a" should be understood as being synonymous with "comprising at least one", unless specified otherwise.

The invention claimed is:

1. A method for regulating the output voltage of the alternator of a generator set, the latter comprising an engine driving the said alternator, the alternator comprising a rotor having a pole wheel, the method comprising the following step:
    modifying, at least upon an increase in the load at the output of the alternator, the current in the pole wheel, so as to bring the output voltage of the alternator to a set point voltage of the alternator below that before increase in the load, the modification of the current in the pole wheel being dependent on the deceleration of the engine.

2. The method according to claim 1, wherein the modification of the value of the current in the pole wheel leads to an increase in the rotation speed of the engine on account of the decrease in the output voltage of the alternator and in which the value of the current in the pole wheel is modified again, so as to bring the value of the output voltage back to that before increase in the load.

3. The method according to claim 1, wherein the engine is a turbocharged engine.

4. The method according to claim 1, wherein the increase in the load corresponds to a slowing of the engine below a predefined speed.

5. The method according to claim 4, wherein the predefined speed being, for example, the nominal speed less 4%, especially a frequency of the voltage of 48 Hz for a nominal speed corresponding to a nominal frequency of 50 Hz.

6. The method according to claim 1, wherein the modification of the current of the pole wheel is performed by decreasing the exciter excitation current.

7. The method according to claim 1, wherein the modification of the current of the pole wheel is performed for example by virtue of a pulse width modulation of the voltage across the terminals of the pole wheel.

8. The method according to claim 1, wherein the discrepancy between the setpoint voltage and the nominal voltage is proportional to the deceleration.

9. A system for regulating the output voltage of the alternator of a generator set, the latter comprising an engine driving the said alternator, the alternator comprising a rotor having a pole wheel, the system being configured to modify, at least when the load increases at the output of the alternator, the value of the current in the pole wheel, so as to bring the output voltage of the alternator to a setpoint voltage below that before increase in the load, the modification of the value of the current in the pole wheel being dependent on the derivative of a quantity representative of the rotation speed of the engine.

10. The system according to claim 9, wherein the setpoint voltage being chosen in such a way that the discrepancy between the nominal voltage and the setpoint voltage is dependent at least on the deceleration of the engine.

11. The system according to claim 9, wherein the system is configured to apply the voltage reduction when the increase in the load applied corresponds to a decrease in the frequency of the voltage below a predefined value, for example the nominal frequency less 4%.

* * * * *